July 27, 1954   H. H. HOLLY   2,684,501
PATTY MOLDING DEVICE
Filed Sept. 16, 1950   6 Sheets-Sheet 1

Inventor:
Harry H. Holly,
By Schroeder, Merriam,
Hofgren & Brady, Attys.

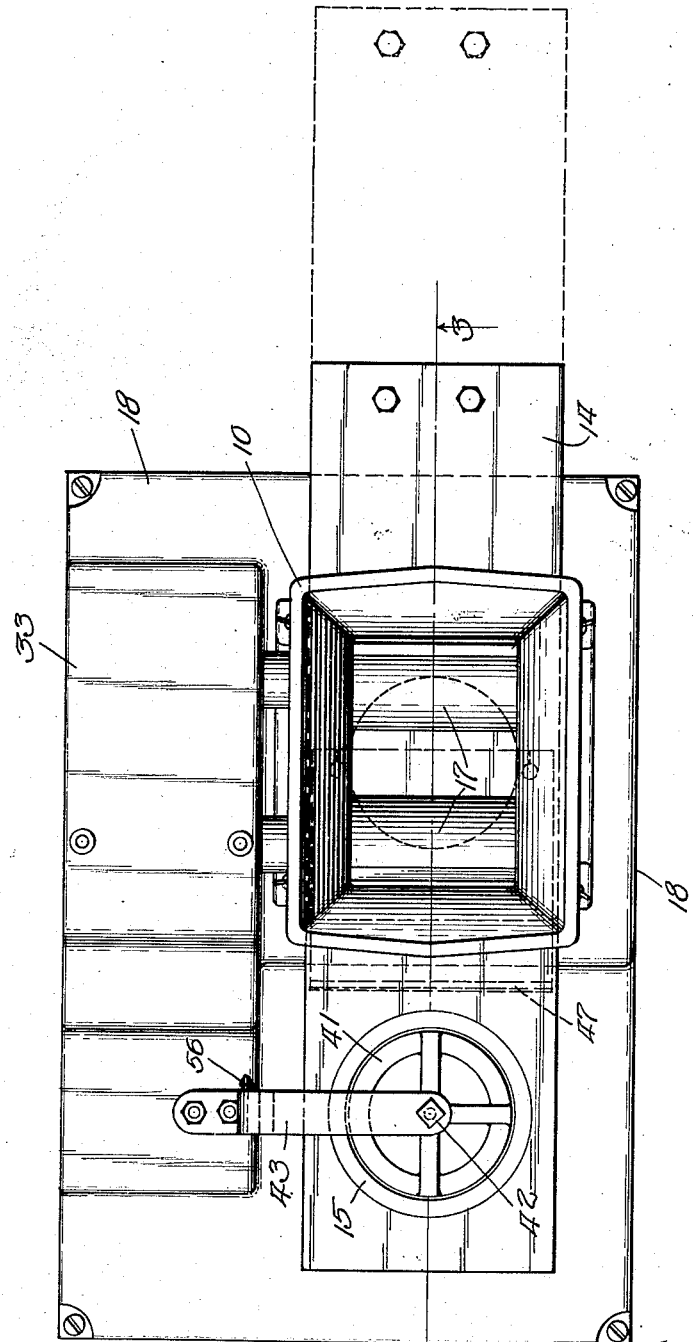

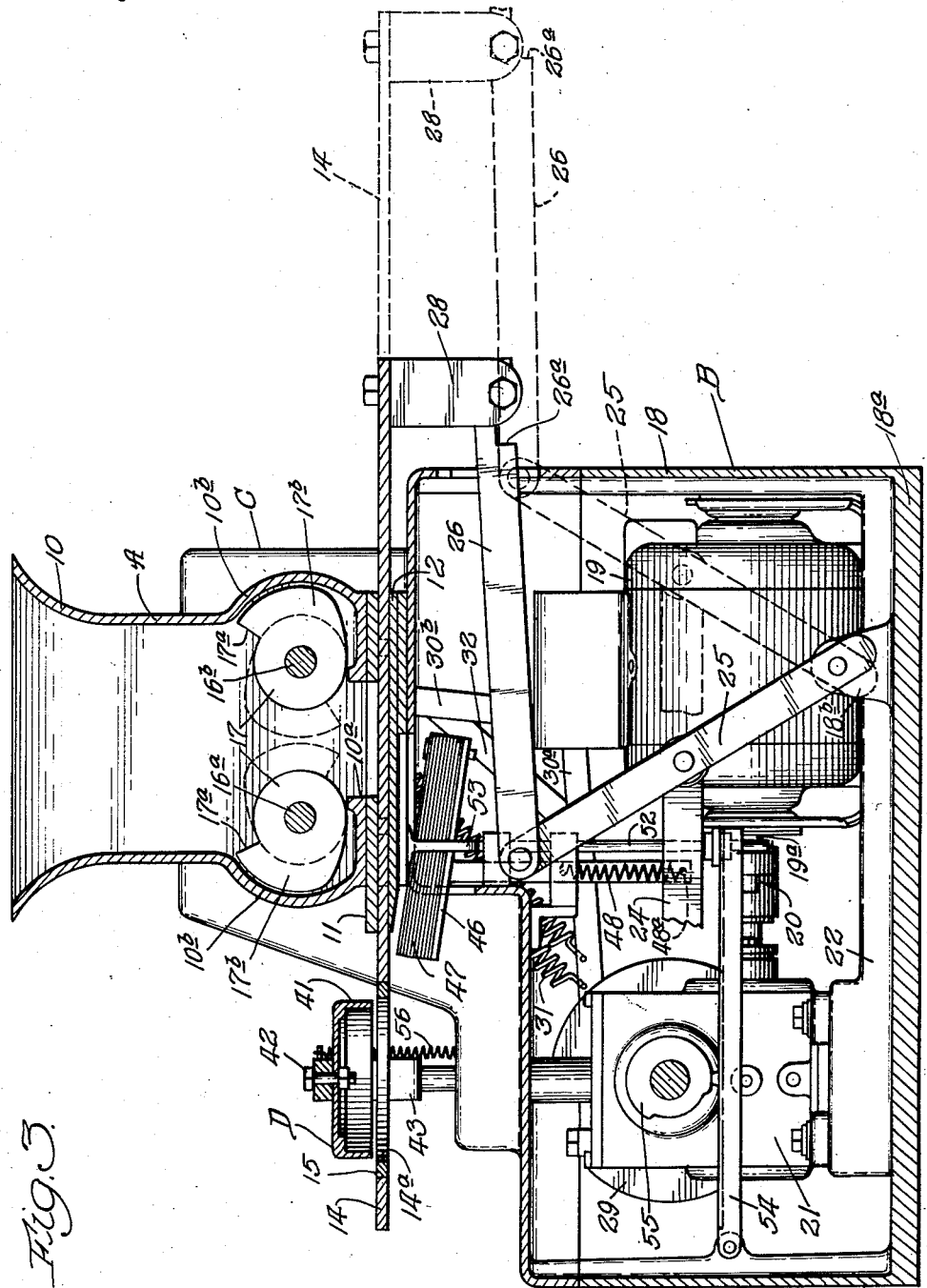

July 27, 1954 H. H. HOLLY 2,684,501
PATTY MOLDING DEVICE
Filed Sept. 16, 1950 6 Sheets-Sheet 4
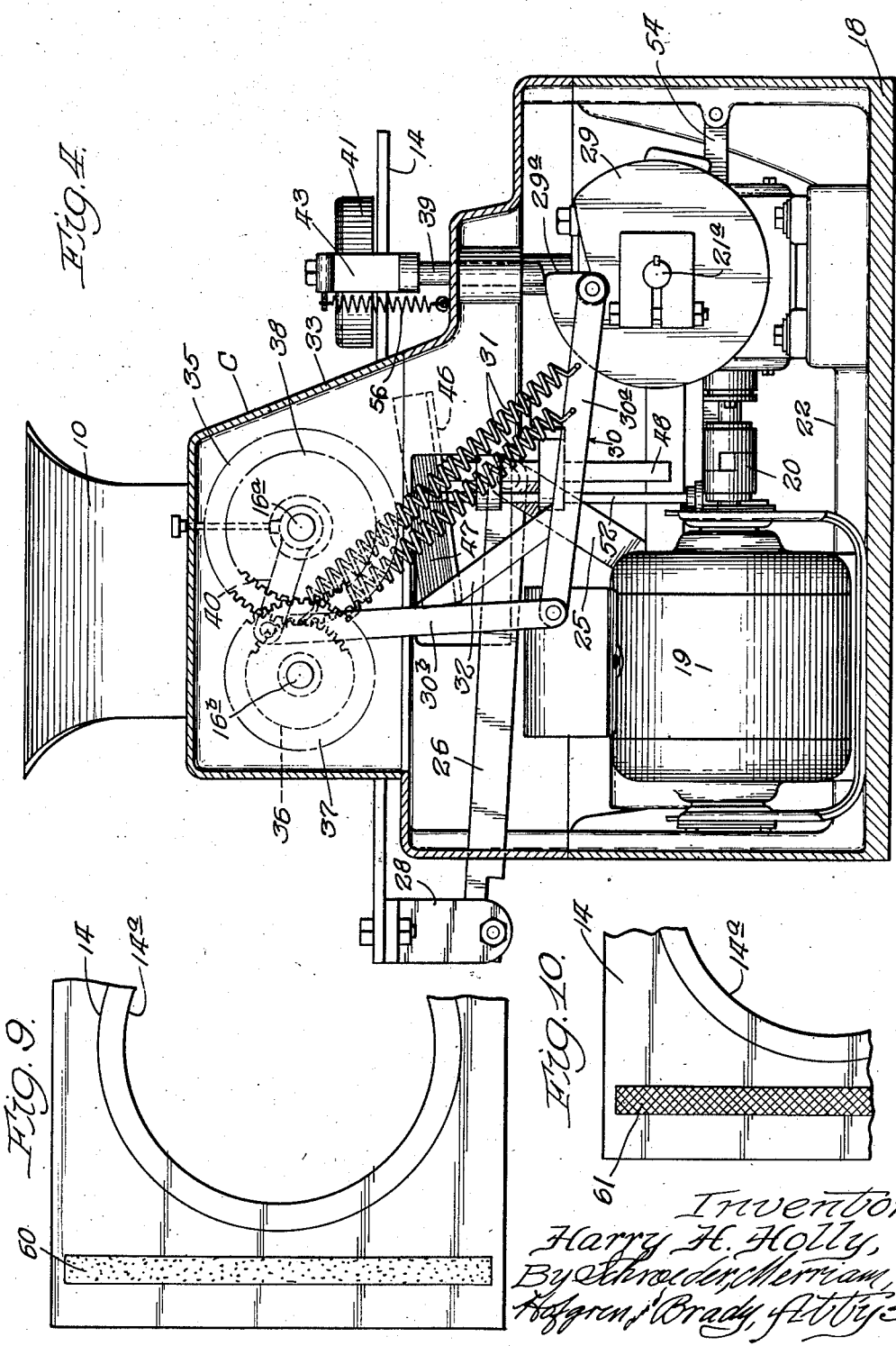
Inventor:
Harry H. Holly,
By Schroeder, Merriam,
Hofgren & Brady, Attys.

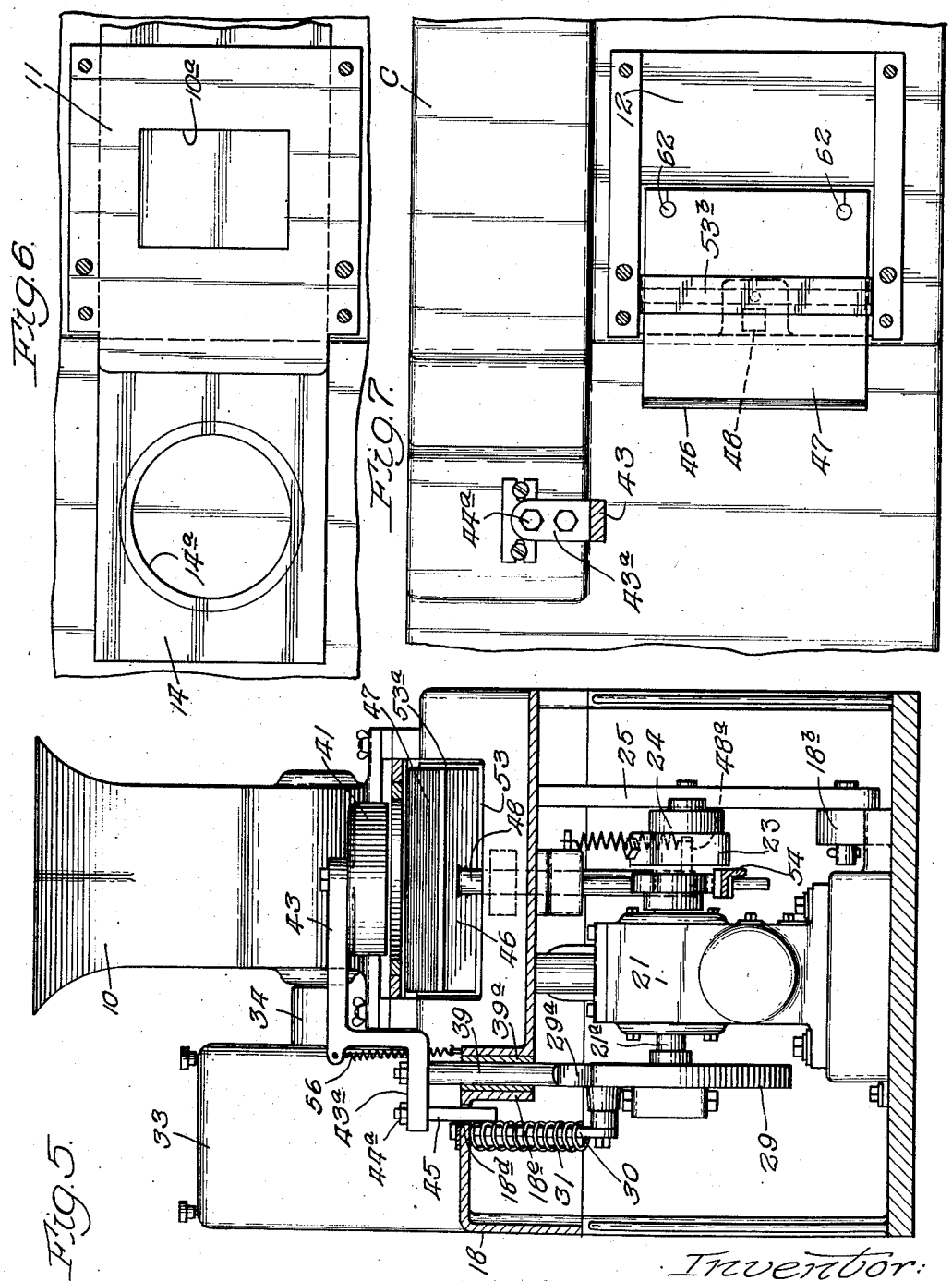

July 27, 1954

H. H. HOLLY 2,684,501

PATTY MOLDING DEVICE

Filed Sept. 16, 1950

Inventor:
Harry H. Holly,
By Schroeder, Merriam,
Hofgren & Brady, Attys.

Patented July 27, 1954

2,684,501

UNITED STATES PATENT OFFICE 2,684,501

PATTY MOLDING DEVICE

Harry H. Holly, Chicago, Ill., assignor of one-half to Hollymatic Corporation, a corporation of Illinois Application September 16, 1950, Serial No. 185,243

5 Claims. (Cl. 17—32)

This invention relates to a device for applying a separator sheet to a patty, and relates particularly to such a device used in conjunction with an apparatus including a mold having a mold opening and means for first charging the opening with plastic material and then removing the molded material therefrom.

One of the features of this invention is to provide means for supporting a separator sheet adjacent the mold with at least one of the patties and the mold having an adherent surface portion, means for moving the separator sheet into contact with the mold and contained patty prior to removing the patty from the opening to adhere the sheet across the opening, together with means for moving the supporting means and mold relative to each other to move the adhered sheet from the supporting means.

A more specific feature of the invention is to provide such a structure wherein a stack of separator sheets are provided on a supporting platform and located between the position of the mold opening where it receives the plastic material and the second position of the mold opening where the material is removed from this opening with the platform and stack being inclined to the mold plate and having the edge of the stack nearest the plate adjacent the removing means, in combination with means for moving the platform toward the mold plate to bring the nearest edge of the topmost sheet into contact with the plate while the mold opening moves from the hopper to the removing means to adhere a sheet to the mold plate and across the opening.

Other features and advantages of the invention will be apparent from the accompanying drawings and the description of one embodiment of the invention.

Of the drawings:

Figure 2 is an plan view of the device of Figure 1 showing in dotted lines one extreme position of the mold plate;

Figure 3 is a vertical section taken substantially along line 3—3 of Figure 2;

Figure 4 is a side elevation of the device taken opposite the side shown in Figure 3 and with a side plate removed;

Figure 5 is a section taken substantially along line 5—5 of Figure 1;

Figure 6 is a section taken substantially along line 6—6 of Figure 1;

Figure 7 is a section taken substantially along line 7—7 of Figure 1;

Figure 9 is a fragmentary bottom view of the mold plate adjacent the mold opening and illustrating an alternate embodiment of the invention; and Figure 10 is a view similar to Figure 9 but showing a second alternate embodiment of the invention.

Figure 1:
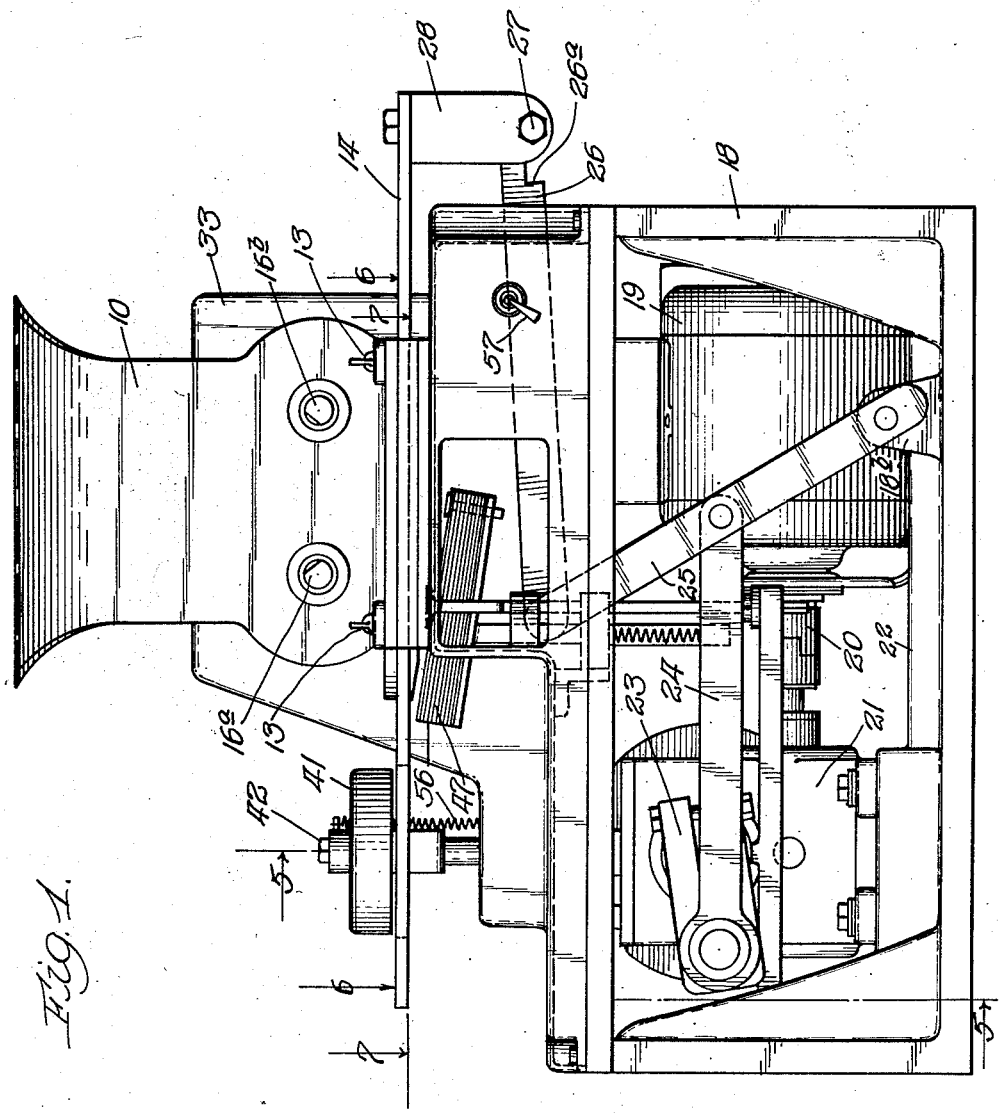
Figure 1 is a side elevation of a molding device illustrating one embodiment of the invention.

The molding device shown in the accompanying drawings is similar to that described and claimed in my co-pending application Serial No. 82,419, filed March 19, 1949, now Patent No. 2,530,061, issued November 14, 1950, which discloses and claims the apparatus illustrated herein for forcing the plastic material from the hopper into the mold opening. The apparatus for removing the molded patty from the mold opening is described and claimed in my copending application Serial No. 82,420, filed March 19, 1949, now Patent No. 2,530,062, issued November 14, 1950. The device illustrated here, however, employs a different type of feed for the paper separator sheets and this portion of the device is the subject of the present invention.

The molding device shown in the accompanying drawings comprises a hopper and feed portion A, a bottom portion B housing the driving mechanism, a gear case C mounted on the bottom portion B and arranged at one side of the hopper and feed portion A, and a transfer portion D located on the bottom portion B and in front of the hopper and feed portion A.

The hopper and feed portion A comprise a hopper 10 adapted to contain a relatively large quantity of plastic material such as ground meat and having a bottom opening 10a with the hopper being mounted on a supporting plate 11 which, in turn, is held on a base 12 by wing nuts 13. The supporting plate 11 and base 12 have their central portions spaced from each other to provide room for a slide plate 14 arranged therebetween. The slide plate 14 has ends extending considerable distances beyond the corresponding ends of the plate 11 and the base 12.

The hopper 10, supporting plate 11, and base 12 may be easily assembled and disassembled for cleaning as explained more fully in my above mentioned Patents 2,530,061 and 2,530,062.

The slide plate 14 is provided with a mold opening 14a for receiving plastic material that is forced from the hopper through the opening 10a. As shown in Figure 3 the mold opening 14a is an opening in an annular plate 15 held in the slide plate 14. The plate 14 serves not only as a mold but also as a part of the transferring apparatus for transferring a portion of the plastic material from the mold.

The sides of the hopper 10 are provided at two opposite sides thereof with the rounded portions 10b, each having the shape of a section of a cylinder. These rounded portions are located adjacent the bottom of the hopper 10 and on opposite sides of the hopper opening 10a. Located within the mold 10 are a pair of rotatable axles 16a and 16b arranged substantially parallel to each other and above and on opposite sides of the hopper opening 10a. Mounted on each axle 16a and 16b is a feeder 17, these feeders being rotatable with the axles 16a and 16b. Each feeder is provided with a ram portion 17a located on the periphery of the feeder. Each ram portion comprises a flat section that substantially coincides with the radius of a feeder 17. The outer surface of each feeder is substantially circular for a distance greater than 180° beginning at the base of a ram portion 17a. The surface opposite the ram portion extends away from the center of the feeder and is curved to provide a protuberance 17b. As shown in Figure 3, each protuberance is located within a rounded portion 10b when the feeder is in position with the ram portion 17a at substantially its greatest distance from the hopper opening 10a.

The bottom portion b of the molding device houses the major portion of the driving mechanism. This bottom portion is provided with a casing 18 including a bottom plate 18a. Mounted on this bottom plate is a motor 19 having a shaft 19a attached through a flexible coupling 20 to the shaft of a gear reducer 21. This gear reducer is mounted on a support 22 which in turn is mounted on the bottom plate 18a. The support 22 also serves to support a motor 19.

The gear reducer 21 is provided with a shaft 21a to which is attached a drive member 23 for rotation therewith. One end of the drive member 23 is rotatably attached to one end of an arm 24. The other end of the arm 24 is rotatably attached at substantially the mid-point of a second arm 25. This second arm has one end rotatably attached to a bracket 18b that is mounted on the bottom plate 18a. The other end of the arm 25 is rotatably attached to one end of a third arm 26 with the opposite end of this third arm being provided with a notched portion 26a on the bottom thereof which rests on and is in engagement with a bolt 27 located adjacent the bottom of a downwardly extending bracket 28 attached to the rear end of the slide plate 14. This notched portion 26a provides a lost motion connection between the third arm 26 and the slide plate 14.

The end of the gear reducer shaft 21a then opposite the end on which the drive member 23 is mounted has attached thereto a rotatable circular cam plate 29. This cam plate 29 is provided with a depression such as a relatively deep notch 29a on one portion of its periphery. A linkage member 30 formed of two legs 30a and 30b is provided with one end of both legs being rotatably attached together and the opposite end of one leg 30a rotatably attached to the cam plate 29 at a point adjacent the bottom of the notch 29a. The opposite end of the other leg 30b extends up into the gear case C. The two legs 30a and 30b are urged together by a pair of relatively heavy coil springs 31 arranged substantially parallel to each other and having their ends attached at spaced points on the legs 30a and 30b. Means are provided for limiting the extent of movement of the legs 30a and 30b toward each other. As shown in Figure 3, this limiting means comprises a stop member bar 32 attached to one leg 30b and extending to a point where its other end is abutted by the other leg 30a. The gear case C is provided with a removable housing 33 spaced from the hopper 10. The axles 16a and 16b extend through the side of the hopper 10 and into the housing 33. Each axle is separable at a point between the hopper 10 and housing 33 and is held together by an annular connector 34. There is provided a first gear 35 within the housing 33 and mounted for rotation on the axle 16a. This gear 35 is located adjacent the wall of the housing that is adjacent the hopper 10; also within the housing there is provided a second gear 36 mounted on the other axle 16b for rotation therewith. The first gear 35 meshes with the second gear 36, and the first gear has a circumference that is considerably greater than the circumference of the second gear. Mounted on the same axle 16b is a third gear 37. This third gear is positioned adjacent the side of the housing that is the furthest from the hopper 10. The third gear 37 which has a diameter larger than the second gear 36 meshes with a fourth gear 38 that is of substantially the same diameter as that of the third gear 37. This fourth gear 38 is mounted on the axle 16a which holds the gear 35. This fourth gear 38 is rigidly fixed on the axle 16a for rotation therewith.

Attached to the axle 16a is a lever 40 with the outer end of this lever being attached to the upper end of the leg 30b of the linkage member 30. When the ram portions 17a are in the position shown in Figure 3 this lever will extend upwardly and at a small angle to the horizontal, as is shown in Figure 4.

When the slide plate 14 is moved to a position so that the opening 14a is beneath the hopper opening 10a, this mold opening is filled with the plastic material from the hopper 10. The slide plate is then moved to the position shown in Figure 3. In order to remove the portion of plastic material from within the mold opening 14a, there is provided a transferring apparatus D. As shown, this apparatus comprises a knock-out member 41 of substantially circular shape normally positioned above the mold opening 14a, as shown in Figure 3. This knock-out member is preferably of the same shape as the mold opening. The member 41 is connected by means of a bolt 42 to the end of an overhanging lever arm 43. The lower end of the arm 43 is provided with a horizontal portion 43a which is attached by means of a bolt 44a to a downwardly extending substantially square leg 45, which in turn extends through an opening 18d in the top of the casing 18. This leg 45 serves to guide the vertical movement of the arm 43 and the attached knock-out member 41. The arm 43 and knock-out member are urged in a downward direction by resilient means such as coil spring 56. This spring has one end attached to the lever arm 43 and the other end attached to the top of the casing 18.

In order to cause vertical movement of the lever arm 43 and thus the knock-out member 41, there is provided an actuating member 39 attached to the arm portion 43a. This actuating member 39, as shown, is a vertical rod that is slidably held in a bearing 39a located in an enlarged portion 18e of the casing 18. The bottom of the actuating member 39 rests against the periphery of the cam plate 29. The cam plate with its notch 29a serves as a timing device for operating the actuating member 61.

The device shown in the drawings is so proportioned that when the slide plate is in position shown in the drawings, the feeders 17 are turned back to a position where the ram portions 17a are furthest from the opening 10a and the arms 24, 25 and 26 are moved to the left, as shown in Figure 3. In this position the actuating member 61 is just ready to drop down in the notch 29a on the further movement of the cam plate in a counterclockwise direction as viewed in Figure 4.

Figure 8:
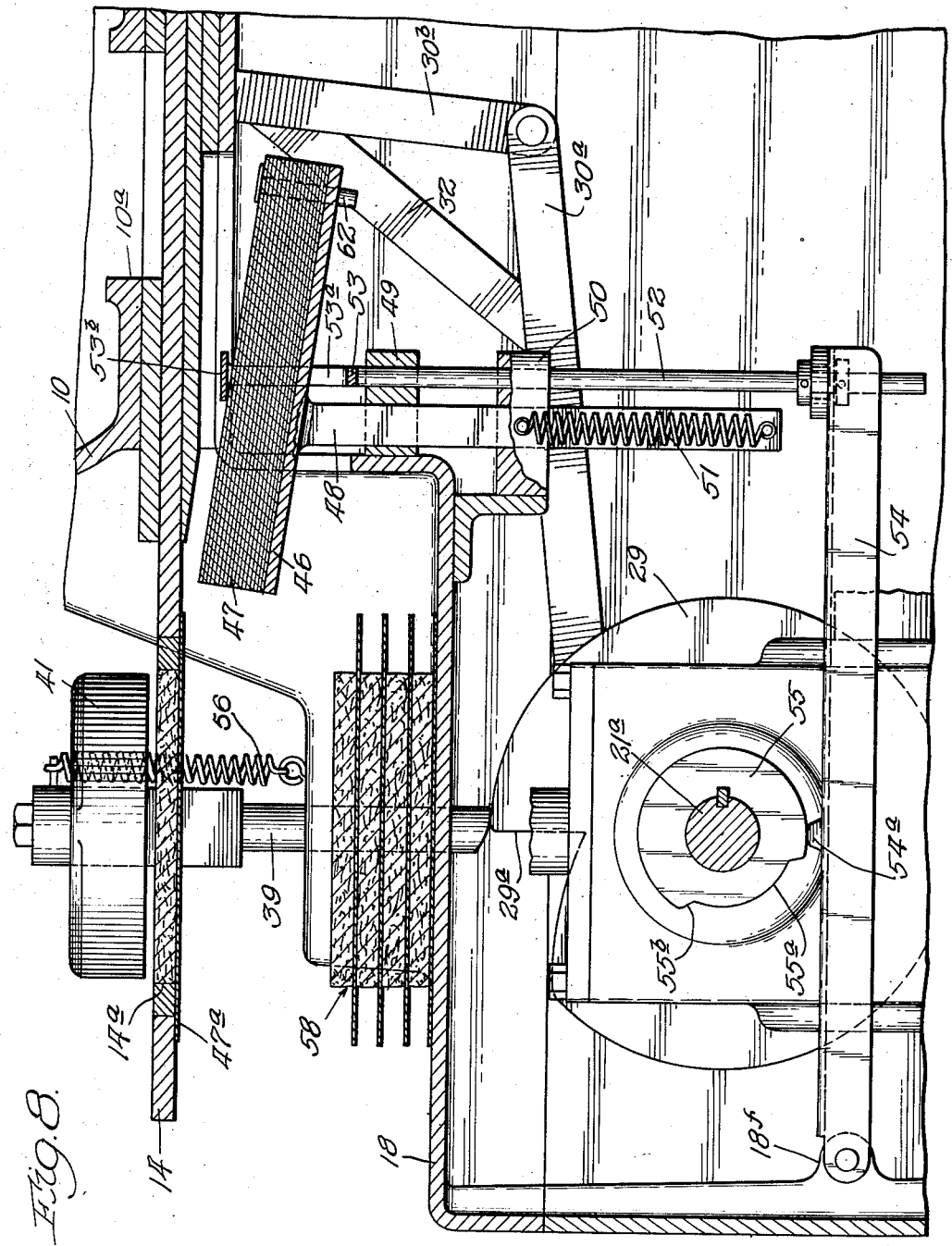
Figure 8 is an enlarged detailed fragmentary section somewhat similar to Figure 3 and illustrating the feeding mechanism for the separator sheets.

The apparatus for applying a separator sheet to the molded patty is shown most clearly in Figure 8. As shown, this apparatus comprises a supporting platform 46 on which is arranged a stack 47 of separator sheets 47a, such as sheets of grease resistant paper. The platform 46 and stack 47 are arranged at an angle to the mold plate 14 so that the edge of the stack that is nearest the bottom of the plate 14 is adjacent the knock-out member 41 of the removing means. The platform 46 is mounted on the upper end of a vertically movable rod 48 which is slidably held in spaced brackets 49 and 50. This movable rod 48 is constantly urged upwardly by a coil spring 51 attached to the lower bracket 50 and an outwardly extending arm 48a on the bottom of the rod 48.

In order to control the operation of the platform 46 and stack 47, there is provided a second upwardly extending rod 52 also slidably held in brackets 49 and 50. This second rod 52 has its bottom end extending beneath the bottom of the first rod 48. The upper end of this second rod 52 is provided with a yoke-shaped member 53 having side arms 53a extending around the sides of the platform 46 and stack 47 and a top portion 53b engaging the top of this stack.

The bottom portion of the second rod 52 beneath the bottom end of the first rod 48 may be loosely attached to one end of an arm 54 in any conventional way as indicated at 54c in Figure 8. This arm 54 extends laterally of the second rod 52 and has the opposite end pivotally attached to a bracket 18f provided on the inner surface of the casing 18.

This arm 54 passes between the drive member 23 and the gear reducer 21 and immediately beneath the gear reducer shaft 21a. Mounted on this shaft between the gear reducer 21 and the drive member 23 is a cam plate 55 locked to this shaft for rotation therewith. As shown in Figure 8, the major portion of this cam has a circular periphery. For slightly more than 90° of the cam 55 this periphery is provided with an arcuate depressed portion 55a. The cam plate 55 has its periphery in engagement with an upwardly extending knob 54a on the arm 54. This knob and the depressed portion 55a of the cam each have inclined sides so that the top will readily ride on the peripheral surface of the cam plate 55.

As the mold plate 14 moves back and forth between the hopper 10 and the knock-out member 41, the cam plate 55 is rotated in timed relationship with this movement. When the mold opening 14a moves from the hopper 10 to a point adjacent the nearest edge of the stack 47 of separator sheets, the knob 54a enters the first part 55b of the depressed portion 55a of the cam plate 55. This permits the rods 48 and 52 to move upwardly under the urging of spring 51 so that the nearest edge of the topmost sheet 41a of the stack 47 contacts the bottom of the mold plate 14 slightly ahead of the mold opening 14a. The bottom of the mold plate 14 having an adherent surface portion adjacent the mold opening, causes this topmost sheet to stick to the bottom of the mold plate. As the mold plate continues its movement toward the position shown in Figure 8, this topmost sheet is drawn from the stack and the nearest edge of the stack causes the sheet to be pressed against the bottom of the mold plate and across the mold opening 14a, as shown in Figure 8. As soon as this action has been completed, the cam plate is in position so that it forces the arm 54 downwardly to move the stack 47 and platform 46 downwardly to the position shown in Figure 8. The mold plate is then in position for the removal of the patty from the mold opening and for return movement to place the mold opening again in communication with the hopper. The second rod 52 has the important function of not only raising and lowering the platform and stack but also maintaining an equal spacing of the topmost sheet of the stack from the mold plate irrespective of the thickness of the stack. This is true because the spring 51 always urges the top of the stack into engagement with the top portion 53b of the yoke 53. As individual sheets are removed from the stack the topmost sheet at all times is urged against the top portion 53b so that even though the platform itself is moved upwardly the topmost sheet on the stack will always be at the same spacing from the mold plate 14.

In operating the device, the hopper 10 is filled with a plastic material such as ground meat, the electrical circuit to the motor 19 is closed by operating the switch 57. The motor 19 causes the cam plate 29 to rotate counterclockwise as shown in Figure 4, thus dropping the actuating member 39 into the notch 29a. The dropping of the actuating member causes the knock-out member 41 to be pulled sharply downwardly under the urging of spring 46. The knock-out member enters the mold opening 14a and dislodges the portion of plastic material that is held therein so that the plastic material, such as ground meat with the adhered separator sheet 47a falls onto the top of the casing 18 to form a stack 58 of patties, each separated by a sheet 47a. Further movement of the cam plate 29 causes the actuating member 39 to raise the knock-out member 41 from the mold opening. Further operation of the motor 19 rotates the driving member 23 and urges arms 24, 25 and 26 to the right, as shown in Figures 1 and 3. The notch 26a in the outer end of arm 26 provides a lost motion connection so that there is a period during which the plate 14 is not moved. This period is sufficient for the knock-out member 41 to be raised from the mold opening 14a. As the drive member 23 continues to rotate, the arms 24, 25 and 26 are forced rearwardly and pull the slide plate rearwardly until the drive member 23 is in a position substantially diametrically opposite that shown in Figure 3, and the mold opening 14a coincides with the hopper opening 10a.

During this operation of the motor, the cam plate 29 is rotated so that the end of the leg 30a of the linkage member 30 that is attached to the cam plate 29 is moved downwardly. This downward movement applies tension to the springs 31 and thus to the lever 40 to cause rotation of the lever in a counterclockwise direction, as shown in Figure 4. The rotation of the lever 40 causes rotation of the gears 35, 36, 37 and 38 so that the ram portions 17a move inwardly toward each other and downwardly toward the mold opening 10a. Because of the provision of the springs 31 sufficient pressure is applied to the plastic material at all times irrespective of the amount of resistance encountered in the movement of the feeders. The feeders are always returned to their initial position by the leg 30a abutting against the adjacent end of the bar 32 which acts as a stop member.

After the portion of plastic material has been fed into the mold opening 14a, the mold plate 14 is again moved to the left, as shown in Figures 1, 3 and 8. As is pointed out above, during this movement the platform 46 and stack 47 of separator sheets 47a are permitted to move upwardly under the urging of spring 51. The topmost sheet on the stack 47 contacts the bottom of the mold adjacent the opening 14a and becomes adhered thereto so that further movement of the mold plate to the position where the mold opening is under the knock-out member 14, presses the topmost sheet against the bottom of the plate and across the bottom of the opening 14a. As soon as this happens, the larger peripheral surface of the cam 55 engages the knob 54a and pushes the arm 54 downwardly, thus drawing the platform 46 and stack 47 away from the mold plate to its initial position.

The above description of the operation of the device shows that either the plastic material or the bottom of the mold plate or both must be adhesive to the separator sheets, at least in the area adjacent the mold opening 14a. This is necessary in order that the separator sheet can be withdrawn from the stack 47. Where the plastic material is ground meat the juices from the meat which immediately coat both the top and bottom surfaces of the mold plate provide the degree of adhesiveness required, and where it is stated in the claims that the mold plate has an adherent surface portion, it is intended to include those instances where ground meat or similar material is molded and the juices or other liquid from the molded material provide the necessary adhesive character. In some instances, however, it will be advisable to provide a separate adherent portion on the bottom of the mold plate immediately forwardly of the mold opening 14a. This is particularly true where other plastic materials than ground meat are being molded. Such alternate constructions are shown in Figures 9 and 10. In Figure 9, the adherent material 60 is in the form of a strip of adhesive material such as a sticky tape extending across the bottom of the mold plate, and which may be easily applied and removed when desired. Such a tape may be the ordinary and well known Scotch tape. In the construction illustrated in Figure 10 the bottom of the mold plate may be knurled, as indicated at 61, in order to provide the necessary adhesive character to start the withdrawal of the topmost sheet on the stack 47. The invention as set out in the claims is intended to cover all such structures. The separator sheets in the stack 47 may be releasably retained on the platform 46 in any manner desired. In the structure shown there is employed the well known pins 62 engaging slotted portions of the sheets in the stack 47. Such a construction is an old and well known expedient and is not shown in detail.

As can be seen from the above description, the device of this invention operates continuously to mold patties of plastic materials. After these patties are molded they are ejected from the device in such a manner as to be arranged in a stack. This device which may be used for molding any plastic material is particularly adapted for molding and shaping patties of ground meat such as hamburgers. As all the operating parts of the device are interrelated, the device is simple to construct so that the proper timing is achieved. Thus the mold opening 14a is always aligned with the hopper opening 10a while the feeders 17 are forcing plastic material out the opening 10a. The mold opening 14a is always under the knock-out member 41 during engagement of the actuating member 39 with the notch 29a in the cam plate 29. Similarly the stack 47 of separator sheets is always pressed upwardly against the mold plate 14 when the mold opening 14a is approaching the knock-out member 41.

While I have shown and described certain embodiments of my invention, it is to be understood that it is capable of many modifications, the changes therefore in the construction and arrangement may be made without departing from the spirit and scope of the invention as applied in the appended claims.

I claim:

1. Apparatus for applying a separator sheet to a molded plastic material, comprising: a mounting means; a movable mold member on the mounting means having a mold opening adapted to mold a plastic material; a supporting member carried by the mounting means adjacent to the mold member and adapted releasably to support a stack of separator sheets each of which is substantially coextensive with but extending beyond the edges of the mold member defining the opening when the sheet is applied across the mold opening, surface portions of the mold member adjacent to the mold opening being adherent to a separator sheet; a drive means carried by the mounting means; means operatively connecting the drive means and the mold member for causing the opening to traverse the sheet supporting member; and means operatively connecting the drive means and the sheet supporting member for moving the sheet supporting member toward the mold opening, the mold member drive and sheet supporting member drive being operatively connected in synchronism whereby the topmost separator sheet on the stack is pressed against the plastic material in the opening and against said surface portions while the opening passes adjacent to the supporting member with continued movement of the mold member serving to withdraw the sheet from the supporting member.

2. Apparatus for applying a separator sheet to a molded plastic material, comprising: a mounting means, a movable mold member on the mounting means having a mold opening adapted to mold a plastic material; a supporting member carried by the mounting means beneath the mold member and adapted releasably to supporting a stack of separator sheets each of which is substantially coextensive with but extending beyond the edges of the mold member defining the opening when the sheet is applied across the mold opening, the surface portions of the mold member adjacent to the mold opening being adherent to a separator sheet; a drive means carried by the mounting means; means operatively connecting the drive means and the mold member for causing the opening to traverse the sheet supporting member; and means operatively connecting the drive means and the sheet supporting member for moving the sheet supporting member generally upwardly toward the mold opening, the mold member drive and sheet supporting member drive being operatively connected in synchronism whereby the topmost separator sheet on the stack is pressed against the bottom of the plastic material in the opening and against said surface portions while the opening passes above the supporting member with continued movement of the mold member serving to withdraw said topmost sheet from the supporting member.

3. A device for applying a separator sheet to a plastic material within a mold opening in a mold member into which the plastic material is received and from which it is discharged, comprising: a mounting means movably carrying the mold member; a supporting member carried by the mounting means adjacent to the mold member and adapted releasably to support a separator sheet adjacent to the mold member, the sheet being substantially coextensive with but extending beyond the edges of the mold member defining the opening when the sheet is applied across the mold opening, the surface portion of the mold member adjacent to the mold opening being adherent to a separator sheet; apparatus operatively connected to the supporting member for moving the supporting member in one direction to move said separator sheet into contact with the mold member and with the plastic material in the mold opening and extending across the mold opening; and apparatus operatively connected to the mold member for moving the mold member and opening relatively transversely to the direction of movement of the supporting member to withdraw the sheet from the supporting member.

4. A device for applying a separator sheet to a plastic material within a mold opening in a mold member into which the plastic material is received at a charging station and from which it is discharged at a discharging station, comprising: a mounting means movably carrying the mold member; a supporting member carried by the mounting means beneath the mold member and adapted releasably to support a stack of separator sheets adjacent to the mold member, the stack being inclined at a small angle to the path of movement of the mold member with the end of the stack more remote from the charging station being closer to said path and each sheet being substantially coextensive with but extending beyond the edges of the mold member defining the opening when the sheet is applied across the opening, the surface portion of the mold plate adjacent to the mold opening being adherent to a separator sheet; apparatus operably connected to the supporting member providing movement of the supporting member upwardly toward the mold member during movement thereof from the charging station to the discharging station to adhere the separator sheet to the mold plate and across said opening, said supporting member moving apparatus moving in timed relationship to the mold plate to press said closer edge of the separator sheet against the mold plate and across a portion of the opening when the mold opening is over the sheet, with continued movement of the mold plate toward the discharging station serving to extend the sheet further across the mold opening and to draw said sheet from the supporting member.

5. A device for applying a separator sheet to a plastic material within a mold opening in a mold member into which the plastic material is received and from which it is discharged, comprising: a mounting means movably carrying the mold member; a supporting member carried by the mounting means adjacent to the mold member and adapted releasably to support a separator sheet adjacent to the mold member, the sheet being substantially coextensive with but extending beyond the edges of the mold member defining the opening when the sheet is applied across the mold opening, the surface portion of the mold member adjacent to the mold opening being adherent to a separator sheet; apparatus carried by the mounting means and operatively engaging said separator sheet for contacting said sheet with the mold member and with the plastic material in the mold opening and extending across the mold opening; and apparatus operatively connected to the mold member for moving the mold member and opening relative to the supporting member to withdraw the sheet from the supporting member.

References Cited in the file of this patent

UNITED STATES PATENTS

| Number | Name | Date |
|---|---|---|
| 1,107,795 | Jagenberg | Aug. 18, 1914 |
| 1,989,911 | Brasseur | Feb. 5, 1935 |
| 2,105,211 | Bessonette | Jan. 11, 1938 |
| 2,299,314 | Elesh et al. | Oct. 20, 1942 |
| 2,338,939 | Holly | Jan. 11, 1944 |
| 2,530,062 | Holly | Nov. 14, 1950 |
| 2,554,821 | Garfunkel | May 29, 1951 |